(12) United States Patent
Yoshimoto et al.

(10) Patent No.: US 9,032,586 B2
(45) Date of Patent: May 19, 2015

(54) WIPER BLADE

(75) Inventors: Takao Yoshimoto, Toyohashi (JP);
Naoki Torii, Toyohashi (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 13/575,251

(22) PCT Filed: Oct. 27, 2011

(86) PCT No.: PCT/JP2011/074817
§ 371 (c)(1),
(2), (4) Date: Jul. 25, 2012

(87) PCT Pub. No.: WO2012/063650
PCT Pub. Date: May 18, 2012

(65) Prior Publication Data
US 2013/0219648 A1     Aug. 29, 2013

(30) Foreign Application Priority Data

Nov. 10, 2010  (JP) .................................. 2010-251906
Dec. 6, 2010   (JP) .................................. 2010-271563

(51) Int. Cl.
B60S 1/38          (2006.01)

(52) U.S. Cl.
CPC B60S 1/38 (2013.01); *B60S 1/3856* (2013.01); *B60S 1/3858* (2013.01); B60S 1/3801 (2013.01); B60S 1/3879 (2013.01); *B60S 1/3891* (2013.01); *B60S 2001/382* (2013.01); *B60S 2001/3822* (2013.01)

(58) Field of Classification Search
CPC .... B60S 1/3886; B60S 1/3887; B60S 1/3891; B60S 1/3893; B60S 1/38; B60S 1/3856; B60S 1/3858; B60S 1/3801; B60S 1/3879; B60S 2001/382; B60S 2001/3822
USPC ............. 15/250.43–250.48, 250.32, 250.361, 15/250.201
See application file for complete search history.

(56) References Cited

U.S. PATENT DOCUMENTS

| | | | |
|---|---|---|---|
| 5,493,750 A * | 2/1996 | Bollen et al. .............. | 15/250.452 |
| 6,449,797 B1 | 9/2002 | De Block | |
| 2004/0250369 A1 | 12/2004 | Matsumoto et al. | |
| 2007/0204422 A1 | 9/2007 | Machida et al. | |
| 2008/0098559 A1 * | 5/2008 | Machida et al. .......... | 15/250.201 |
| 2008/0271277 A1 * | 11/2008 | Mizote et al. .............. | 15/250.48 |

FOREIGN PATENT DOCUMENTS

| | | | | |
|---|---|---|---|---|
| EP | 1568558 A1 * | 8/2005 | ................ | B60S 1/38 |
| EP | 1857337 A1 * | 11/2007 | ................ | B60S 1/38 |
| JP | 2002-537179 A | 11/2002 | | |
| JP | 2005-22632 | 1/2005 | | |
| JP | 2006036130 A * | 2/2006 | ................ | B60S 1/38 |

(Continued)

OTHER PUBLICATIONS

JP2007216736 (machine translation), 2007.*

(Continued)

*Primary Examiner* — Mark Spisich
*Assistant Examiner* — Andrew A Horton
(74) *Attorney, Agent, or Firm* — Sheridan Ross P.C.

(57) ABSTRACT

A wiper blade assembly which includes a blade, at least one backing which is fitted into an attachment groove of the blade, and an elongated holder member which is interconnected to the blade.

13 Claims, 12 Drawing Sheets

(56) References Cited

FOREIGN PATENT DOCUMENTS

| | | | | |
|---|---|---|---|---|
| JP | 2006062598 A | * | 3/2006 | ................ B60S 1/38 |
| JP | 2007118621 A | * | 5/2007 | ................ B60S 1/38 |
| JP | 2007-176459 | | 7/2007 | |
| JP | 2007-216736 A | | 8/2007 | |
| JP | 2008-162590 | | 7/2008 | |
| WO | WO 2005/123471 A1 | | 12/2005 | |
| WO | WO 2011/031516 | | 3/2011 | |

OTHER PUBLICATIONS

JP2006062598 (machine translation), 2006.*

International Search Report prepared by the Japanese Patent Office on Jan. 17, 2012, for International Application No. PCT/JP2011/074817.

International Preliminary Report on Patentability for International (PCT) Patent Application No. PCT/JP2011/074817 dated May 14, 2013, 8 pages.

* cited by examiner

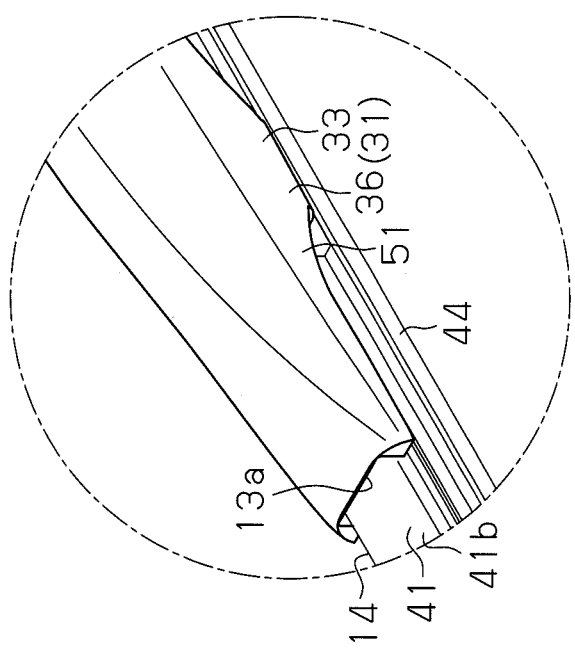

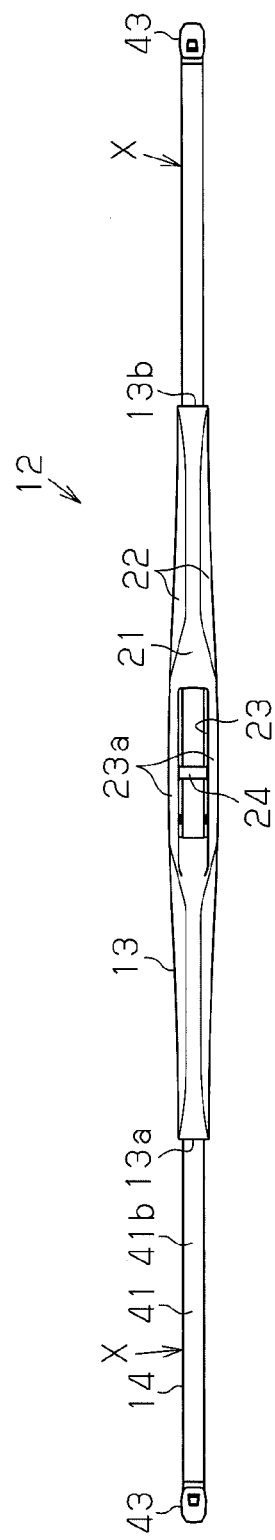

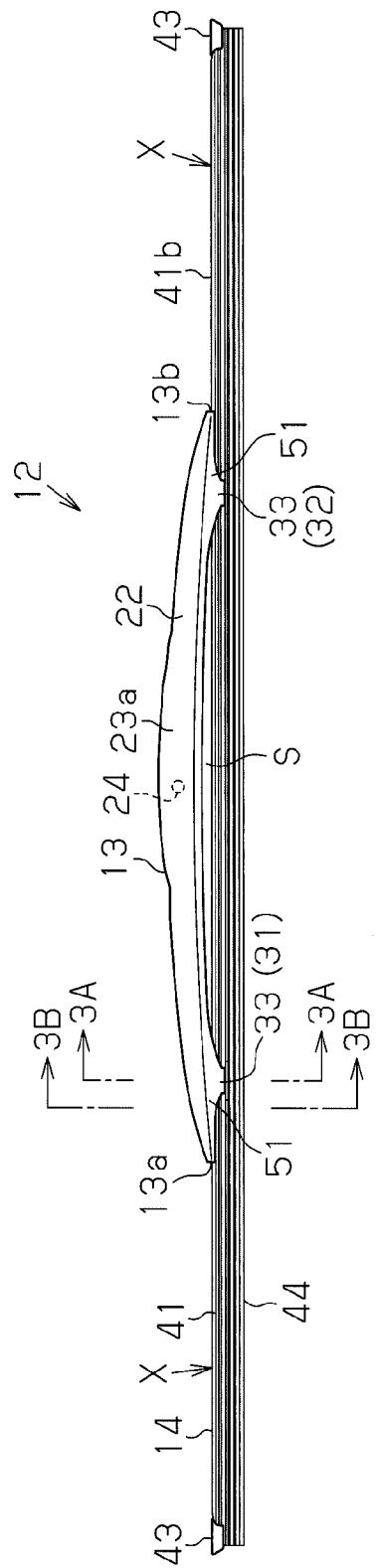

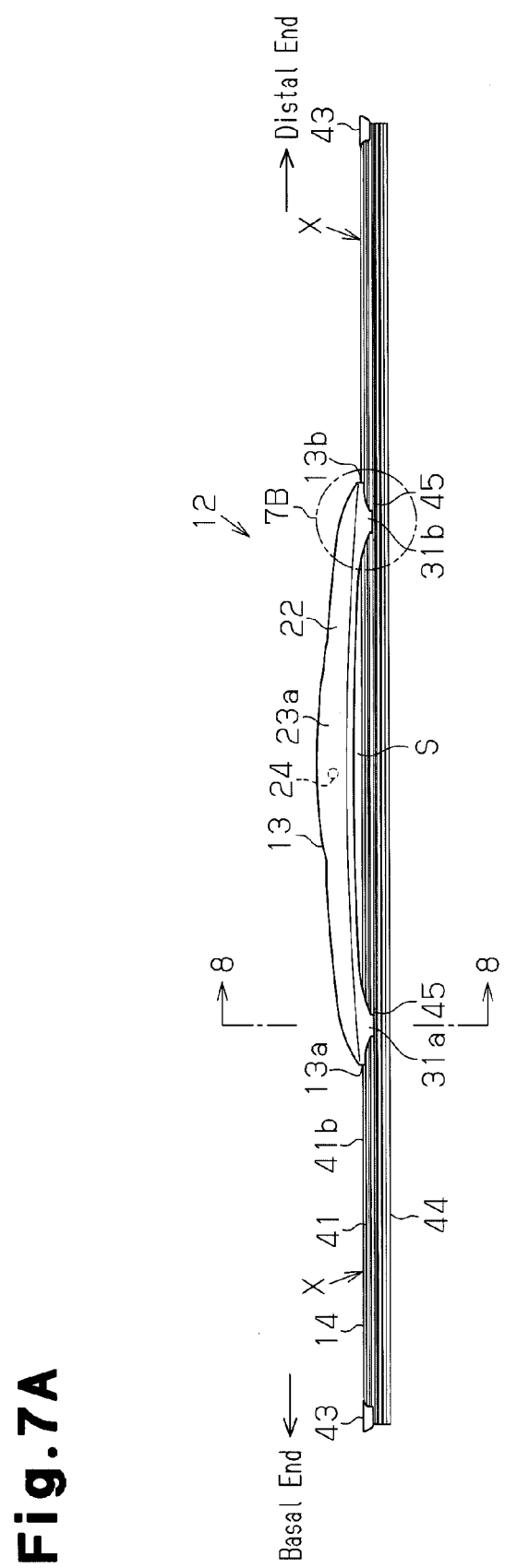

WIPER BLADE

CROSS REFERENCE TO RELATED APPLICATIONS

This application is a national stage application under 35 U.S.C. 371 of PCT Application No. PCT/JP2011/074817 having an international filing date of 27 Oct. 2011, which designated the United States, which PCT application claimed the benefit of Japanese Patent Application No. 2010-251906 filed on 10 Nov. 2010 and Japanese Patent Application No. 2010-271563 filed on 6 Dec. 2010, the entire disclosure of each of which is incorporated herein by reference.

TECHNICAL FIELD

The present invention relates to a wiper blade that wipes, for example, a windshield of a vehicle.

BACKGROUND ART

A vehicle wiper includes a wiper arm, which is driven and operated by a wiper motor, and a wiper blade, which is supported by a distal portion of the wiper arm.

Patent document 1 describes an example of a wiper blade including a holder member, of which longitudinally central part is coupled to the distal portion of a wiper arm, a rubber blade, which is held by the holder member to wipe a wiping surface, and a backing, which has a predetermined rigidity and is formed so that its central part is outwardly curved opposite to the wiping surface. The backing is made of a spring material and fitted into an attachment groove, which extends in the longitudinal direction of the rubber blade.

The holder member has two end portions in the longitudinal direction. Each holding portion includes a holding portion provided with two holding hooks that are paired in a widthwise direction (or wiping direction). The holding hooks of each holding portion hold an upper part of a base of the rubber blade in the widthwise direction. The rubber blade projects outward in the longitudinal direction from each holding portion, and the projecting portion forms a following end portion that freely follows the curve of the wiping surface using the elastic force of the backing.

Such a wiper blade is advantageous in that, when the holder blade has the same length same as the rubber blade, the height of the wiper blade can be kept low, the field of view for driving is prevented from being obstructed, and the number of components is reduced thereby lowering costs.

Further, in such a wiper blade, a cap is attached to each of the two longitudinal end portions of the rubber blade, which is attached to the backing. The cap is hooked to a hooking portion arranged on the rubber blade thereby preventing separation from the end portions of the rubber blade. The cap accommodates a longitudinal end portion of the backing together with the longitudinal end portion of the rubber blade. This prevents separation of the backing from the attachment groove.

PRIOR ART DOCUMENT

Patent Document

Patent Document 1: Japanese Laid-Open Patent Publication No. 2005-22632

DISCLOSURE OF THE INVENTION

Problems that are to be Solved by the Invention

In the wiper blade of patent document 1, for example, when a following end portion of the rubber blade gets caught while wiping the windshield and a force that bends the following end portion is applied in the widthwise direction, the holding hooks arranged at the two end portions of the holder member receive the load. Thus, in particular, when the holder member is formed of resin, the rigidity of the holding hook needs to be set to be sufficiently high. Such a limitation lowers the degree of freedom for designing the holder member.

In the rubber blade of the wiper blade of patent document 1, for example, when snow or the like applies a force acting to separate the cap from the rubber blade, the end portion of the rubber blade, which is hooked to the cap, is pulled outward in the longitudinal direction together with the cap. In this case, when the end portion of the rubber blade is stretched in the longitudinal direction to a position where the end portion of the backing accommodated in the cap separates from the cap, the backing may be forced out of the attachment groove.

One object of the present invention is to provide a wiper blade capable of keeping the load applied to the holding portion of the holder member small.

Another object of the present invention is to provide a wiper blade capable of preventing separation of the backing.

One aspect of the present invention provides a wiper blade including a rubber blade that wipes a wiping surface. The rubber blade includes a base and an attachment groove, which extends in a longitudinal direction. A backing has a predetermined rigidity and includes a central part outwardly curved opposite to the wiping surface. The backing is formed from a spring material and fitted into the attachment groove of the rubber blade. An elongated holder member includes a longitudinally central part coupled to a distal portion of a wiper arm, a first end and second end, which are arranged at two longitudinal sides, and a first holding portion and second holding portion, which are respectively arranged at the sides of the first end and the second end. The first holding portion and the second holding portion hold the base of the rubber blade. The rubber blade projects in the longitudinal direction from the first and second holding portions of the holder member thereby forming a following end portion that follows a curve of the wiping surface. The holder member includes two contact wall portions extending outward in the longitudinal direction from at least one of the first holding portion and the second holding portion and respectively contact two side surfaces of the following end portion.

A further aspect of the present invention provides a rubber blade that wipes a wiping surface. The rubber blade includes a base, attachment grooves extending in a longitudinal direction in widthwise sides of the base, and an end portion. A backing has a predetermined rigidity and includes a central part outwardly curved opposite to the wiping surface. The backing is formed by spring materials fitted into the corresponding attachment grooves of the rubber blade, and the backing includes a hooking portion. A cap is attached to each of two longitudinal end portions of the base of the rubber blade to prevent separation of the backing from the attachment grooves. The cap includes a hooking portion. An elongated holder member includes a longitudinally central part, which is coupled to a distal portion of a wiper arm, and a plurality of holding portions arranged in the longitudinal direction to hold the base of the rubber blade. The rubber blade projects outward in the longitudinal direction from the holding portions of the holder member thereby forming a following end portion that follows a curve of the wiping surface. The end portion of the rubber blade includes a first hooking portion, which is hooked to the hooking portion arranged in the cap, and a second hooking portion, which is hooked in a longitudinal direction to the hooking portion arranged in the backing. The first hooking portion is arranged so that the first hooking portion at least partially overlaps the second hooking portion in the longitudinal direction or the first hooking portion is located inward in the longitudinal direction from the second hooking portion.

BRIEF DESCRIPTION OF THE DRAWINGS

FIG. 1B is an enlarged view showing portion 1B encircled by a dashed line in FIG. 1A.

FIG. 2A is a plan view of a wiper blade.

FIG. 2B is a side view of the wiper blade.

FIG. 7A is a side view of the wiper blade of the second embodiment.

DETAILED DESCRIPTION OF THE PREFERRED EMBODIMENTS

First Embodiment

One embodiment of the present invention will now be described with reference to the drawings.

Figure 1A:
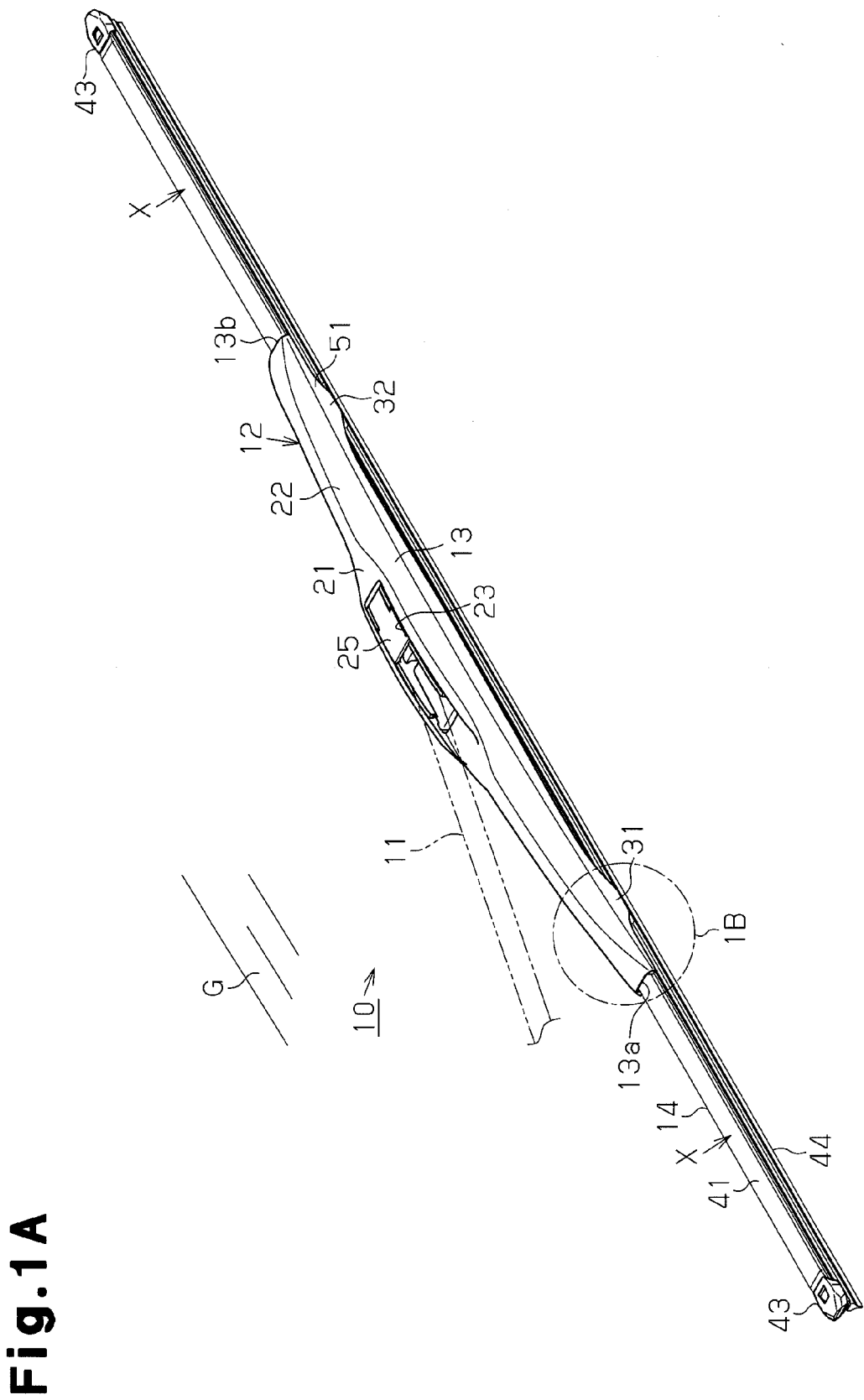
FIG. 1A is a perspective view of a vehicle wiper according to a first embodiment of the present invention.

FIG. 1A shows a vehicle wiper 10 that wipes off raindrops or the like from a wiping surface G of an automobile windshield. The vehicle wiper 10 includes a wiper arm 11, which is coupled to a vehicle (not shown), and a wiper blade 12, which is supported by a distal portion of the wiper arm 11 and arranged in contact with the wiping surface G. The wiper blade 12 swings back and forth when a wiper motor (not shown) drives and operates the wiper arm 11 to wipe the wiping surface G. A spring (not shown) arranged in the wiper arm 11 pushes the wiper blade 12 against the wiping surface G.

As shown in FIGS. 1A, 2A, and 2B, the wiper blade 12 includes a single elongated holder member 13 and a rubber blade 14, which is held by the holder member 13. The holder member 13 is formed from a resin material, and the rubber blade 14 is formed from a rubber material. The rubber blade 14, which is elongated and longer than the holder member 13, is used to wipe the wiping surface G. The holder member 13 holds the rubber blade 14 at a longitudinally intermediate portion of the rubber blade 14. The rubber blade 14 projects from the two longitudinal ends of the holder member 13, namely, a first end 13a and a second end 13b.

The holder member 13 includes an upper wall portion 21 and two side wall portions 22, which are arranged in a widthwise direction (i.e., wiping direction that is the direction orthogonal to the longitudinal direction). The upper wall portion 21 and the side wall portions 22 form the outer part of the holder member 13. The holder member 13 is formed so that a cross-section perpendicular to the longitudinal direction is substantially U-shaped and opens toward the wiping surface G from the upper wall portion 21 and the side wall portions 22. As shown in FIG. 2B, the upper wall portion 21 is smoothly curved downward (towards wiping surface G) to the two longitudinal end portions of the holder member 13. The two longitudinal end portions of the holder member 13 are tapered as viewed from beside.

A rectangular opening 23 of which longs sides extend in the longitudinal direction as shown in the plan view of FIG. 2A is formed in a longitudinally central part of the holder member 13. A cylindrical coupling shaft 24 is fixed between opposing wall portions 23a, which define the opening 23, extending in the widthwise direction. The opposing wall portions 23a form part of the side wall portions 22 of the holder member 13. A coupling member 25 shown in FIG. 1A is fitted into the opening 23, which is used for coupling with the distal portion of the wiper arm 11, and pivotally coupled to the coupling shaft 24. The distal portion of the wiper arm 11 of which surface facing the wiping surface G includes a free end having the form of U-shaped hook. The distal portion is hooked to the coupling shaft 24 by the coupling member 25, which is attached in to the opening 23 and coupled in a removable manner to the coupling member 25. As shown in FIG. 1A, the wiper arm 11 extends from the U-shaped hook distal portion, which is coupled to the holder member 13, toward the basal side of the wiper blade 12.

Figure 3A:
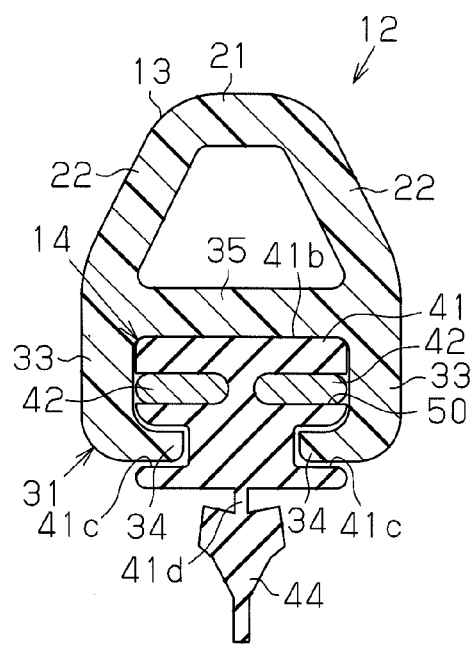
FIG. 3A is a cross-sectional view taken along line 3A-3A in FIG. 2B.

The holder member 13 includes a first holding portion 31 in the proximity of the first end 13a in the longitudinal direction and a second holding portion 32 in the proximity of the second end 13b. The first and second holding portions 31 and 32 have similar structures and each include two holding hooks 36 arranged in the widthwise direction, as shown in FIG. 1B. The first and second holding portions 31 and 32 are formed to hold the rubber blade 14 in the widthwise direction. Specifically, as shown in FIG. 3A, the holding hooks 36 have L-shaped cross-sections and include clamping wall portions 33, which extend downward (towards the wiping surface G) from each side wall portion 22 and facing each other in the widthwise direction, and two holding pieces 34, which extend from the distal ends of the clamping wall portion 33 inward in the widthwise direction (and into holding grooves 41c of the rubber blade 14). A bridge portion 35 extends in the widthwise direction between the clamping wall portions 33 of each of the holding portions 31 and 32 in the holder member 13, which has a substantially U-shaped cross-section. The upper wall portion 21 and each side wall portion 22 also form part of each of the holding portions 31 and 32. The bridge portion 35 transmits the pushing force, which acts toward the wiping surface G and is received from the wiper arm 11 by the holder member 13, to the rubber blade 14. Further, the bridge portion 35 increases the strength of the two holding hooks 36 in the first and second holding portions 31 and 32. The holder member 13 further extends from each of the holding portions 31 and 32 toward the two longitudinal ends of the rubber blade 14.

The upper part of the rubber blade 14 (portion opposite to the wiping surface) is a base 41 held by the two holding hooks 36 in each of the holding portions 31 and 32. The base 41 extends over the entire rubber blade 14 in the longitudinal direction. Each of the two side surfaces in the widthwise direction of the base 41 includes an attachment groove 50 extending in the longitudinal direction. A flat plate-shaped backing 42, which is formed from a spring material, is fitted into each attachment groove 50. The backing 42 has a predetermined rigidity and its longitudinally central part is outwardly curved opposite to the wiping surface G. The backing 42 functions to disperse the pushing force, which acts toward the wiping surface G and is received from the wiper arm 11, in the longitudinal direction through the holder member 13. A resin cap 43 is attached to the two ends of the rubber blade 14 from the longitudinal direction to prevent separation of the backing 42.

The base 41 of the rubber blade 14 is accommodated in an accommodation void inward from the bridge portion 35, the clamping wall portions 33, and the holding pieces 34 of each of the holding portions 31 and 32. The base 41 includes an upper surface 41b, which comes into contact with the bridge portion 35, side surfaces in the widthwise direction of the base 41, which comes into contact with the two clamping wall portion 33, and a lower surface, which comes into contact with the holding piece 34. This holds the base 41 surrounded by the holding portions 31 and 32. The holding pieces 34 are fitted into the holding grooves 41c, which are formed at positions closer to the wiping surface G than the attachment groove 50, in the two widthwise sides of the rubber blade 14. The upper surface 41b of the base 41 includes two protrusions (not shown) protruding from the two longitudinal ends of the bridge portion 35 at the first holding portion (and second holding portion 32) to prevent separation of the rubber blade 14 in the longitudinal direction from the holder member 13.

Figure 3B:
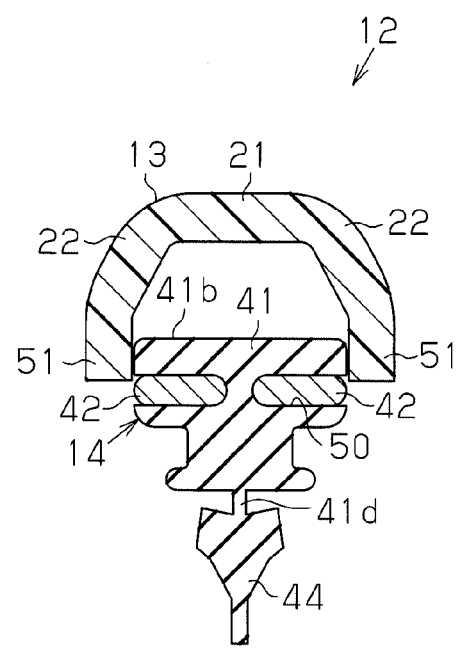
FIG. 3B is a cross-sectional view taken along line 3B-3B in FIG. 2B.

As shown in FIGS. 3A and 3B, the rubber blade 14 includes a wiping portion 44 having a reversed triangular cross-section extending from the lower surface of the base 41 by way of a thin neck portion 41d. Operation of the wiper blade 12 wipes the wiping surface G with the lower end of the wiping portion 44 in contact with the wiping surface G.

As shown in FIGS. 1A, 2A, and 2B, the rubber blade 14 projects outward in the longitudinal direction from each of the holding portions 31 and 32 of the holder member 13. The projecting portions each define a following end portion X, which freely curves and follows the curve of the wiping surface G with the backings 42 fitted to the attachment grooves 50. In other words, each following end portion X of the rubber blade 14 is a free end that is free from the holder member 13 and follows the curve of the wiping surface G by the elastic force of the backings 42. Each of the holding portions 31 and 32 is arranged in the holder member 13 at positions dividing the longitudinal direction of the rubber blade 14 into three substantially equal parts.

As shown in FIG. 2B, a space S is provided between the side wall portions 22 and the upper surface 41b of the base 41 of the rubber blade 14 at a longitudinally intermediate portion of the holder member 13. Thus, when the following end portions X of the rubber blade 14, which is attached with the backings 42, is curved to follow the wiping surface G, the space S functions to allow the upper surface of the central part of the rubber blade 14 to enter between the side wall portions 22 and project outward (so as not to interfere the following action).

In the wiper blade 12 of the above structure, the holder member 13 includes contact wall portions 51, which are located closer to the first end 13a than the first holding portion 31 and closer to the second end 13b than the second holding portion 32. That is, the contact wall portions 51 are located outward in the longitudinal direction from the first holding portion 31 and the second holding portion 32. The contact wall portion 51 near the first end 13a and the contact wall portion 51 near the second end 13b have similar shapes. The two contact wall portions 51 extend downward from the side wall portions 22 of the holder member 13 and are arranged in the widthwise direction. The contact wall portions 51 are continuously connected to each clamping wall portion 33 of the first and second holding portions 31 and 32 extending outward in the longitudinal direction and forms part of the outer part of the holder member 13. As shown in FIG. 3B, the two contact wall portions 51 are arranged in the widthwise direction in contact with the two side surfaces in the widthwise direction of the base 41 of the rubber blade 14 and clamp the base 41 in the widthwise direction. The upper wall portion 21 and each side wall portion 22 of the first holding portion 31 and the second holding portion 32 further extend outward in the longitudinal direction to connect the two contact wall portions 51, which are arranged in the widthwise direction. The contact wall portions 51, the extended upper wall portion 21, and the side wall portions 22 form a substantially U-shaped cross-section that opens toward the wiping surface G.

In the wiper blade 12 having the structure described above, for example, if a longitudinal end portion of the rubber blade 14 (end of following end portion X) gets caught when wiping the wiping surface G, a bending force is applied to the end portion in the widthwise direction (direction along the wiping surface G). In this case, the load is mainly applied to the contact wall portions 51 that are closest to the longitudinal end portion of the rubber blade 14 (located further toward the end portions from the first and second holding portions 31 and 32) in the holder member 13, which come into contact with the rubber blade 14 in the widthwise direction. This keeps the load small applied to the first and second holding portions 31 and 32 of the holder member 13 in the widthwise direction. As a result, the degree of freedom for designing the holder member 13 is increased.

The first embodiment has the advantages described below.

(1) In the present embodiment, the elongated holder member 13 holds the base 41 of the rubber blade 14 with the first holding portion 31 and the second holding portion 32, which are respectively arranged at the sides of the first end 13a and the second end 13b extending toward the two longitudinal ends of the rubber blade 14. The rubber blade 14 projects outward in the longitudinal direction from the first and second holding portions 31 and 32 of the holder member 13, and the projecting portions define the following end portions X that follow the curve of the wiping surface G. The holder member 13 includes two contact wall portions 51 extending outward in the longitudinal direction from the holding portions 31 and 32 and contacting the two side surfaces of the following end portions X. Thus, if a following end portion X of the rubber blade 14, which is attached with the backings 42, is caught when wiping the wiping surface G and a bending force is applied to the following end portion X in the widthwise direction, for example, load is mainly applied to the contact wall portions 51 located outward in the longitudinal direction from the first holding portion 31 (or second holding portion 32) of the holder member 13, that is, the side of the first end 13*a* side (or second end 13*b*). This keeps the load small that is applied to the first and second holding portions 31 and 32 of the holder member 13. As a result, the degree of freedom for designing the holder member 13 is increased.

Figure 4A:
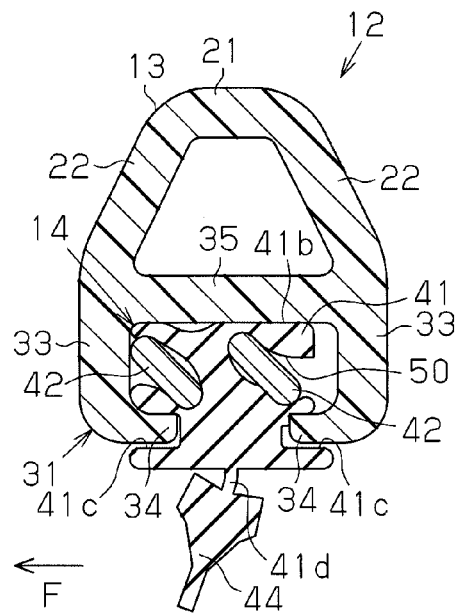
FIG. 4A is a cross-sectional view showing the state in the vicinity of a holding portion when a load is applied to a following end portion in a comparative example.
Figure 4B:
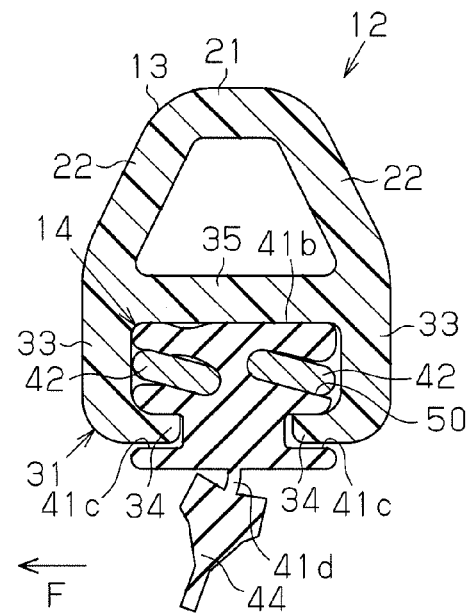
FIG. 4B is a cross-sectional view showing the state in the vicinity of the holding portion when load is applied to a following end portion in the present embodiment.

Further, the flat plate-shaped backing 42, which is formed from a spring material and has a plate surface facing the wiping surface G, is fitted into each attachment groove 50 formed to open in the two widthwise sides of the base 41 of the rubber blade 14. The base 41 is held by the holding portions 31 and 32 of the holder member 13 to prevent separation of the backing 42. Thus, if the contact wall portions 51 are not provided, each of the holding portions 31 and 32 would be located at the end portions of the holder member 13, and the holding portions 31 and 32 would locally receive a large load when a load or a force F is applied in the widthwise direction to the following end portions X of the rubber blade 14. This may greatly deform the base 41 of the rubber blade 14 together with the backings 42, and the backings 42 may be separated from the holding piece 34, as shown in FIG. 4A. In the present embodiment, however, the two contact wall portions 51, which extend outward in the longitudinal direction from the holding portions 31 and 32, come into contact with the two side surfaces of the following end portion X and receives the load. Thus, as shown in FIG. 4B, deformation of the base 41 of the rubber blade 14 at the holding portions 31 and 32 is suppressed, and separation of the backing 42 from the attachment groove 50 is prevented.

In this manner, the two contact wall portions 51 are arranged in correspondence with the load applied to the widthwise sides at the following end portions X of the rubber blade 14. Thus, the load applied to the holding portions 31 and 32 of the holder member 13 can be suppressed in a further preferable manner.

(2) In the present embodiment, the contact wall portions 51 are configured to contact the base 41 of the rubber blade 14 at the following end portions X. That is, contact of the following end portions X with the contact wall portions 51 when load is applied in the widthwise direction to the following end portions X of the rubber blade 14 is contact with the rubber blade 14, which is formed from a rubber material. This prevents the generation of noise during contact at compared with a structure in which the contact wall portion 51 comes into contact with the backings 42, which are formed from a spring material.

(3) In the present embodiment, the first and second holding portions 31 and 32 include the upper wall portion 21, which face the upper surface 41*b* of the base 41 of the rubber blade 14 (by way of the bridge portion 35), the side wall portion 22, which extending from the two widthwise sides of the upper wall portion 21, toward the wiping surface G facing each other, the clamping wall portions 33, which further extending from the side wall portions 22 toward the wiping surface G and clamp the base 41 of the rubber blade 14 from two widthwise sides, and the holding pieces 34, which extends from the distal portion of the clamping wall portions 33 towards the holding grooves 41*c* formed in the rubber blade 14 closer to the wiping surface G than the attachment grooves 50. This clamps the base 41 of the rubber blade 14 from the two widthwise sides with the clamping wall portions 33 of the first and second holding portions 31 and 32. The holding pieces 34 of the first and second holding portions 31 and 32 are inserted into the holding grooves 41*c* of the rubber blade 14. This stably holds the rubber blade 14 on the holder member 13.

(4) In the present embodiment, the first and second holding portions 31 and 32 each include the bridge portion 35 that couples the clamping wall portions 33 and comes into contact with the upper surface 41*b* of the base 41 of the rubber blade 14. This prevents the distance between the opposing clamping wall portions 33 and holding pieces 34 from increasing and maintains the insertion state of the holding piece 34 in the holding groove 41*c*. Further, the bridge portion 35, the clamping wall portions 33, and the holding pieces 34 surround the base 41 of the rubber blade 14. Thus, the base 41 can be easily maintained at the same position. As a result, the rubber blade 14 is held further stably.

(5) In the present embodiment, the upper wall portion 21 and the side wall portions 22 of the holding portions 31 and 32 extended outward in the longitudinal direction, and the two contact wall portions 51 are coupled to each other at the extended portion. In this manner, the longitudinally outer parts of the holding portions 31 and 32 include the upper wall portion 21, the side wall portions 22, and the contact wall portions 51, which connect the side wall portions 22, and have substantially U-shaped cross-sections that open to the wiping surface G. This increases the strength of the contact wall portions 51, and the outer appearance of the holder member 13 is improved.

The first embodiment may be modified as described below.

In the embodiment described above, the clamping wall portions 33 and the contact wall portions 51 of the holding portions 31 and 32 are continuously connected in the longitudinal direction but not particularly limited in such a manner. A gap may be provided between the clamping wall portions 33 and the contact wall portions 51.

In the embodiment described above, the thickness of the base 41 between the attachment grooves 50, which are attached with the backings 42, and the upper surface 41*b* is uniform in the longitudinal direction. However, the thickness may be locally increased at portions that come into contact with the contact wall portions 51 to increase the area of contact with the contact wall portions 51.

In FIG. 3B, the two contact wall portions 51 may extend further downward so as to contact outer widthwise edges of the backings 42.

Figure 5:
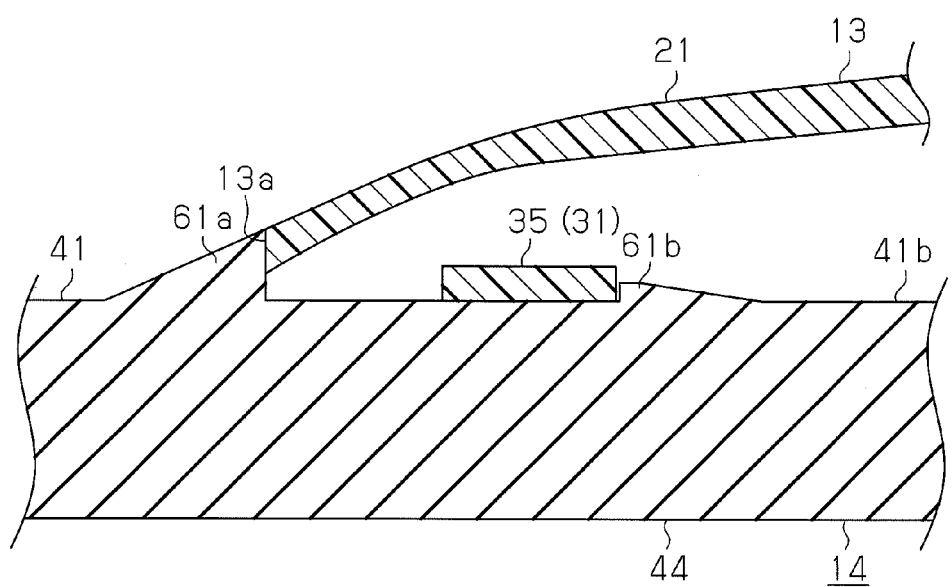
FIG. 5 is a cross-sectional view showing the wiper blade of another example.

In the embodiment described above, two protrusions located at the two longitudinal ends of the bridge portion 35 is formed on the upper surface 41*b* of the base 41 of the rubber blade 14 to prevent separation of the rubber blade 14 in the longitudinal direction from the holder member 13. However, there is no such limitation. For example, as shown in FIG. 5, among two protrusions 61*a* and 61*b*, the protrusion 61*a*, which is located more outward in the longitudinal direction, may be arranged outward in the longitudinal direction of the contact wall portion 51 from the holder member 13 to form a slope that is continuous with the upper wall portion 21. An inner longitudinal end face of the protrusion 61*a* may contact an outer longitudinal end face (first end 13*a* or second end 13*b* of the holder member 13) of the contact wall portions 51 in the holder member 13 to restrict movement in the longitudinal direction of the rubber blade 14. In such a structure, the gap from the rubber blade 14 at the longitudinal end of the holder member 13 may be reduced to improve the outer appearance of the holder member 13. In the example shown in FIG. 5, the bridge portion 35 of the first holding portion 31 restricts movement of the rubber blade 14. However, the bridge portion 35 of the second holding portion 32 may restrict the movement.

In the embodiment described above, the upper wall portion 21 of the holder member 13 extends outward in the longitudinal direction to connect the two contact wall portions 51 arranged in the widthwise direction. However, the contact wall portions 51 may be continuously extended outward in the longitudinal direction from the clamping wall portions 33 of the holding portions 31 and 32 without being connected to the upper wall portion 21.

Second Embodiment

Figure 6:
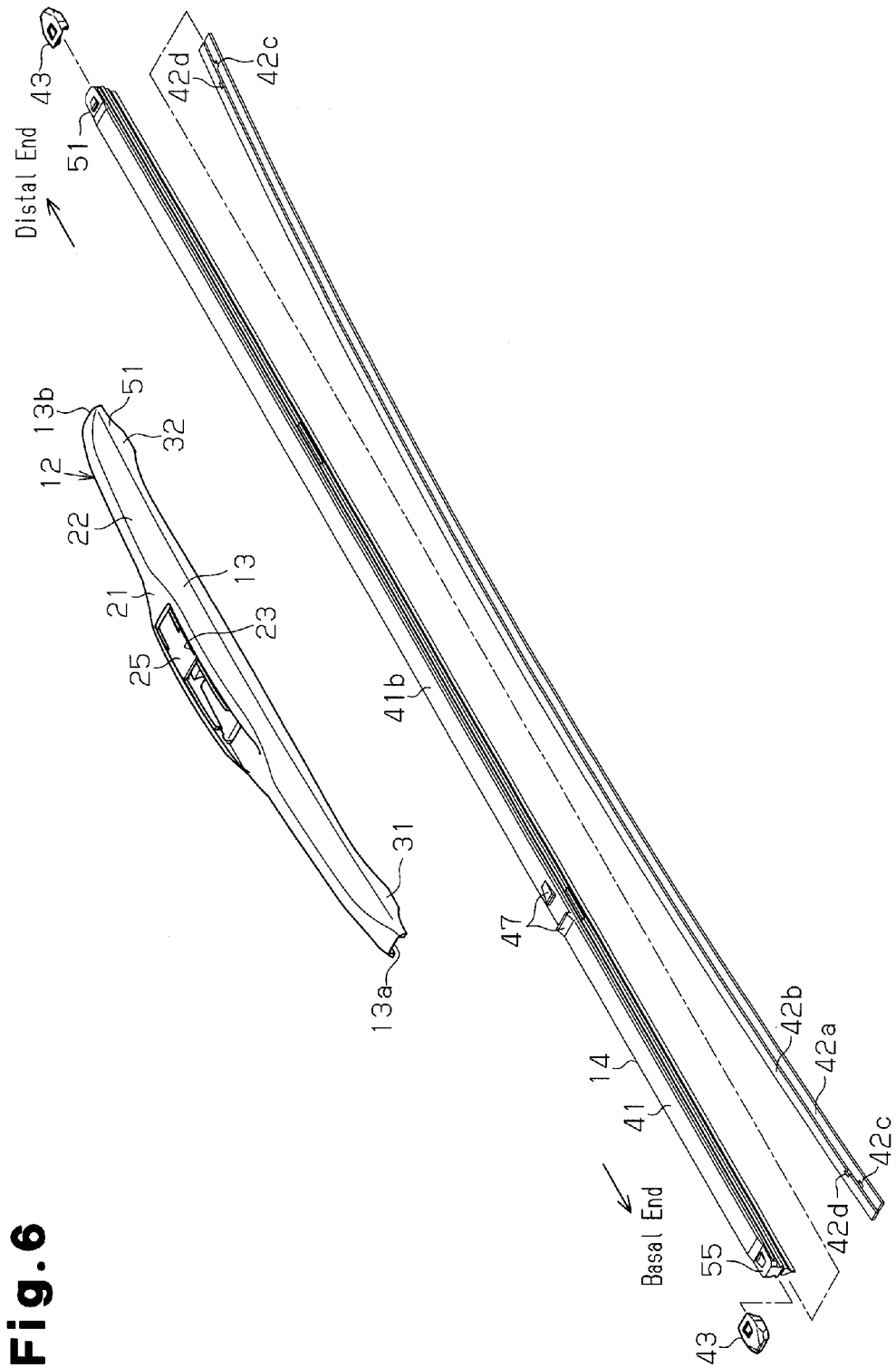
FIG. 6 is an exploded perspective view of a wiper blade according to a second embodiment.

As shown in FIG. 6, a backing 42 includes backings 42a and 42b. The backings 42a, 42b having a predetermined rigidity and includes a longitudinal central part outwardly curved opposite to the wiping surface G. The curved shape of the wiping surface G differs at locations wiped by the distal portion and the basal portion of the rubber blade 14. Thus, the curved shape differs at the distal portion and basal portion of the backings 42a and 42b. That is, the distal portion and basal portion of the backings 42a and 42b have an asymmetric curved shape in the longitudinal direction. Thus, it is required that erroneous coupling of the backings 42a and 42b be prevented.

Figure 11:
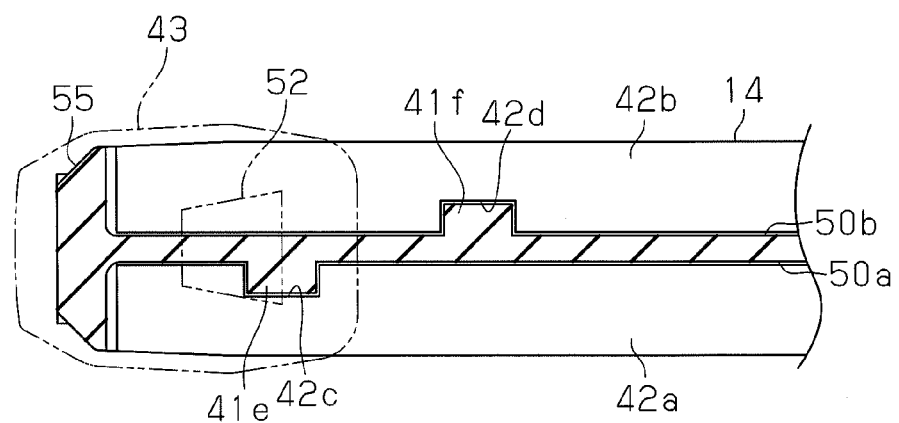
FIG. 11 is a diagram illustrating the positional relationship of a hooking protrusion and a hooking projection of the rubber blade.

In the present embodiment, the backings 42a and 42b include hooking recess 42c and 42d, which are cut into tetragonal shapes out of inner widthwise edges at the two longitudinal ends. Further, the hooking recesses 42c formed in the backing 42a, which is located at the front side as viewed in FIG. 6, is arranged outward in the longitudinal direction from than the hooking recesses 42d formed in the backing 42b, which is located at the rear side. The hooking recesses 42c and 42d are hooking portions arranged in the backing 42. Corresponding hooking projections 41e and 41f (second hooking portions) are respectively formed in attachment grooves 50a and 50b at the two longitudinal ends. As shown in FIG. 11, each hooking projection 41e formed in the attachment groove 50a (front attachment groove as viewed in FIG. 11), which is attached with the backing 42a, is arranged outward in the longitudinal direction from each hooking projection 41f formed in the attachment groove 50b located at the rear side. The hooking projections 41e and 41f can be inserted into the hooking recess 42c and 42d in a normal attachment state in which the backing 42a is attached to the attachment groove 50a and the other backing 42b is attached to the attachment groove 50b. Thus, the backing 42a cannot be attached in a reversed state to the attachment groove 50b, and erroneous coupling of the backings 42a and 42b is prevented.

Figure 7B:
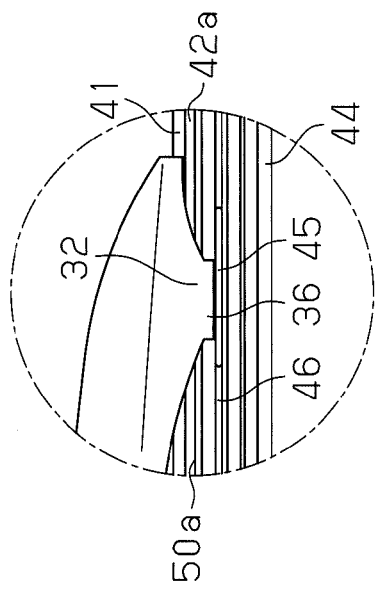
FIG. 7B is an enlarged view of a portion encircled by a broken line in FIG. 7A.
Figure 8:
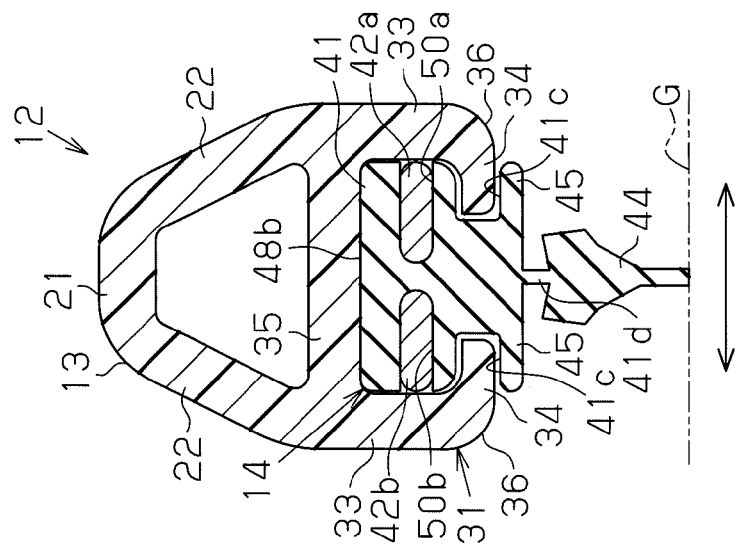
FIG. 8 is a cross-sectional view of the second embodiment taken along line 8-8 in FIG. 7A.

FIG. 7A is a side view of a wiper blade of the second embodiment, and FIG. 7B is an enlarged view showing the portion encircled by a broken line in FIG. 7A. FIG. 8 is a cross-sectional view of the second embodiment taken along line 8-8 in FIG. 7A. Parts described in the first embodiment will not be described. Same reference numerals are given to those components that are the same as the first embodiment.

In FIG. 8, extended portions 45 extend from the two widthwise sides between the base 41 and the wiping portion 44. Bent portions (holding piece 34) at the lower end of the holding hooks 36 of each of the holding portions 31 and 32 enter groove portions (holding grooves 41c) formed by the base 41 and the extended portion 45. Thus, the extended portions 45 are located at the lower side (side of the wiping surface G) in each holding hook 36 (holding piece 34). The extended portions 45 are arranged at two locations in correspondence with the parts held by the holding portion 31 and 32 as shown in the side view of FIG. 7B. In other words, most of the rubber blade 14 in the longitudinal direction except for the portions held by the holding portions 31 and 32 define a non-extended portion 46 (refer to enlarged view of FIG. 7B) in which the extended amount is reduced from the extended portion 45.

Further, as shown in FIG. 6, the upper surface 41b of the base 41 of the rubber blade 14 includes two engagement projections 47 that come into contact with the two longitudinal ends of the bridge portion 35 in the first holding portion 31. This prevents separation of the rubber blade 14 from the holder member 13 in the longitudinal direction. The engagement projections 47 are not provided on the location corresponding to the bridge portion 35 of the second holding portion 32, and the bridge portion 35 of the second holding portion 32 is not engaged with the rubber blade 14 in the longitudinal direction.

Figure 9A:
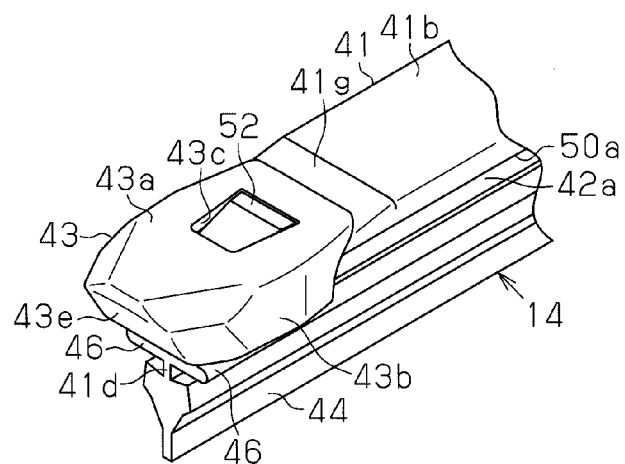
FIG. 9A is a perspective view showing an end portion of a rubber blade.
Figure 9B:
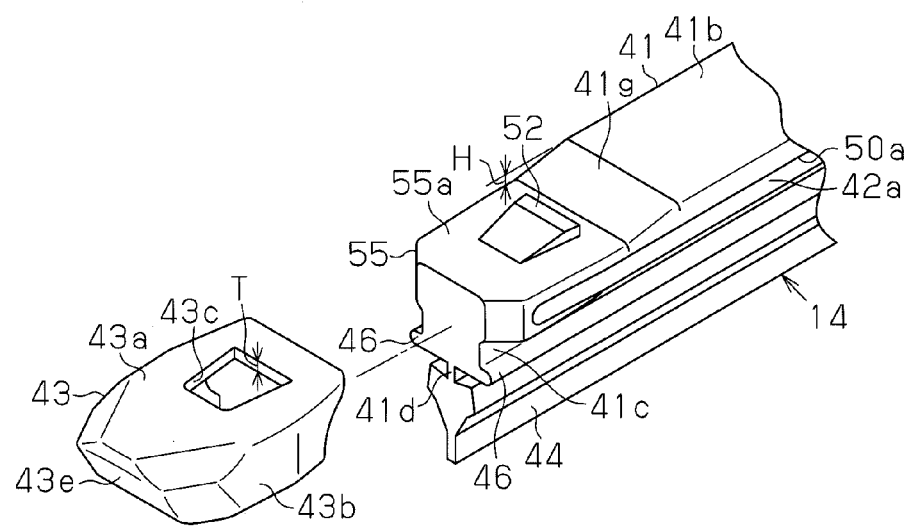
FIG. 9B is a perspective view showing a state in which a cap is removed in FIG. 9A.

In the wiper blade 12, cap attachment portions 55, which are used for attachment of the caps 43, are formed at the longitudinal ends of the base 41 of the rubber blade 14. As shown in FIGS. 9A and 9B, the cap attachment portion 55 includes an upper surface 55a shaped as a stepped recess extending via an inclined surface 41g, which is directed downward and outward in the longitudinal direction, from the upper surface 41b of the longitudinally intermediate portion (portion excluding the cap attachment portions 55) of the base 41. This decreases the thickness of the cap attachment portion 55 in the vertical direction (height-wise direction from the wiping surface G) as compared with the longitudinally intermediate portion of the base 41. The upper surface 55a of the cap attachment portion 55 includes a hooking protrusion 52 having a trapezoidal shape as viewed from above. The hooking protrusion 52 is inclined downward and outward in the longitudinal direction and has a narrow width.

Figure 10:
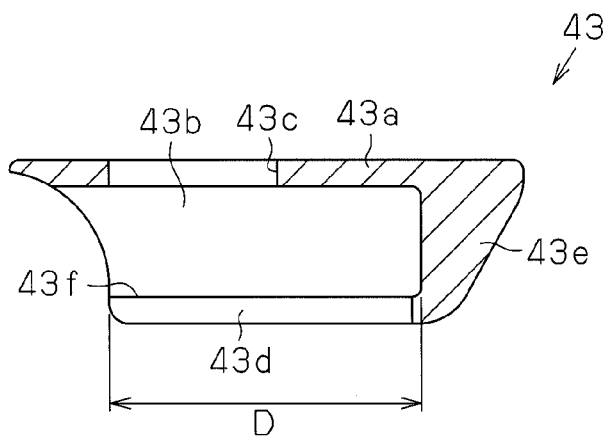
FIG. 10 is a cross-sectional view of the cap.

As shown in FIGS. 9A, 9B, and FIG. 10, the cap 43 includes an upper portion 43a, which covers the upper surface 55a of the cap attachment portion 55, and side portions 43b, which extend from the two widthwise ends of the upper portion 43a to cover the two widthwise end faces of the base 41. A fitting portion 43d projects inward in the widthwise direction from the lower end of each side portion 43b. The fitting portions 43d are arranged in the holding grooves 41c of the rubber blade 14. As shown in FIG. 10, a space (internal space having length D in the longitudinal direction as viewed in FIG. 10) defined and formed by the upper portion 43a, the side portions 43b, the fitting portions 43d, and an end wall portion 43e of the cap 43 serves as an accommodating portion 43f that accommodates the cap attachment portion 55.

A through-hole 43c extends through the upper portion 43a of the cap 43 in the vertical direction of the cap 43. The hooking protrusion 52 (first hooking portion) of the cap attachment portion 55 is fitted into the through-hole 43c. The through-hole 43c is a hooking portion arranged in the cap 43. This hooks the cap 43 in the longitudinal direction with the hooking protrusion 52 of the cap attachment portion 55 and prevents separation of the cap 43 from the cap attachment portion 55. As shown in FIG. 11, the hooking protrusion 52 is arranged at a position where it partially overlaps the hooking projection 41e of the attachment groove 50a in the longitudinal direction. In other words, when viewed in the vertical direction, part of the hooking protrusion 52 overlaps with the hooking projection 41e of the attachment groove 50a.

Accordingly, in a state in which the through-hole 43c of the cap 43 is hooked with the hooking protrusion 52 of the cap attachment portion 55, the ends of the backings 42a and 42b, which are fitted into the attachment grooves 50a and 50b are arranged in the accommodating portion 43f of the cap 43.

As shown in FIG. 9B, a height difference H between the upper surface 55a of the cap attachment portion 55 and the upper surface 41b of the longitudinally intermediate portion (portion excluding the cap attachment portions 55) of the base 41 is set to be substantially equal to the thickness T of the upper portion 43a of the cap 43 in the vertical direction. Thus, the upper surface of the upper portion 43a of the cap 43 and the upper surface 41b of the longitudinally intermediate portion of the base 41 are located on the same plane.

The operation of the above-described embodiment will be hereinafter described.

In the wiper blade 12, when snow or the like applies a load to the cap 43 acting outward in the longitudinal direction, the cap attachment portion 55 of the rubber blade 14 is pulled outward in the longitudinal direction with the hooking protrusion 52, which is hooked to the cap 43, serving as a point of action. Portions inward from the hooking projections 41e (two outward in the longitudinal direction), which is hooked to the backing 42a in the rubber blade 14, subtly stretches in the longitudinal direction due the rigidity of the flat plate-shaped backings 42a and 42b, which are formed from a metal spring material. In contrast, portions outward from the hooking projections 41e stretch relatively easily outward in the longitudinal direction because the rubber blade 14, which is formed from a rubber material, stretches.

The hooking protrusion 52 of the rubber blade 14 is arranged to at least partially overlap the hooking projection 41e in the longitudinal direction. Thus, when load is applied outward in the longitudinal direction to the hooking protrusion 52, a large portion of the load is also applied to the hooking projection 41e. In this state, the hooking projection 41e is hooked to the hooking recess 42c of the backing 42a. This restricts longitudinally outward stretching of the hooking projection 41e. Thus, the cap attachment portion 55, which includes the hooking protrusion 52, resists longitudinally outward stretching. Thus, when load is applied to the cap 43 outward in the longitudinal direction, changes are minimized in the positional relationship of the hooking protrusion 52 of the rubber blade 14 relative to the hooking projections 41e and 41f.

This maintains a state in which the two longitudinal end portions of the backings 42a and 42b are arranged in the accommodating portion 43f of the cap 43. As a result, separation of the backings 42a and 42b from the attachment grooves 50a and 50b is suppressed.

The second embodiment has the advantages described below.

(1) In the present embodiment, the hooking projections 41e and 41f, which are arranged in the two longitudinal end portions of the attachment grooves 50a and 50b of the rubber blade 14, are hooked in the longitudinal direction to the hooking recesses 42c and 42d, which are arranged in the backings 42a and 42b. Thus, portions inward in the longitudinal direction from the hooking projection 41e of the attachment groove 50a in the rubber blade 14 resist longitudinally outward stretching as compared with portions outward in the longitudinal direction from the hooking projection 41e. The hooking protrusion 52, which is hooked to the through-hole 43c of the cap 43 in the rubber blade 14, is arranged to at least partially overlap the hooking projection 41e in the longitudinal direction. Thus, even when, for example, snow or the like applies load to the cap 43 outward in the longitudinal direction, a state in which the longitudinal end portions of the backings 42a and 42b are fitted into the cap 43 can be easily maintained. As a result, separation of the backings 42a and 42b is suppressed.

(2) In the present embodiment, the hooking projections 41e and 41f, which are hooked to the backings 42a and 42b, are respectively arranged in the two longitudinal end portions of the attachment grooves 50a and 50b in the rubber blade 14. Thus, due the rigidity of the backings 42a and 42b, portions between the hooking projections 41e and 41f of the rubber blade 14 subtly stretches in the longitudinal direction. Thus, the hooking protrusion 52 of the rubber blade 14 can be arranged to at least partially overlap the hooking projection 41e in the longitudinal direction or the hooking protrusion 52 can be arranged inward in the longitudinal direction from the hooking projection 41e. This further effectively obtains an effect suppressing separation of the backings 42a and 42b.

(3) In the present embodiment, the two backings 42a and 42b include the hooking recesses 42c and 42d. The hooking recesses 42c and 42d are arranged at positions at which the distance from the longitudinal end portions differs between one backing 42a and the other backing 42b. The hooking recesses 42c and 42d are hooked to the hooking projections 41e and 41f only when the backings 42a and 42b are normally attached to the attachment grooves 50a and 50b. This can prevent erroneous coupling of the backings 42a and 42b in which their basal ends and distal ends in the longitudinal direction are attached in a reversed state to the attachment grooves 50a and 50b.

(4) In the present embodiment, the cap attachment portions 55 at the two longitudinal end portions of the base 41, to which the caps 43 are attached, includes the upper surface 55a that is recessed. This allows for a structure in which the caps 43 do not project upward from the upper surface 41b of the base 41 or a structure in which the upward projection amount of the cap 43 is minimized.

(5) In the present embodiment, the hooking protrusion 52 is arranged on the upper surface 41b of the base 41 of the rubber blade 14. The upper surface 41b of the base 41 has a higher degree of freedom for designing than the widthwise sides of the rubber blade 14. Thus, the hooking protrusion 52 can be set to be large in the widthwise direction so that the area hooked to the through-hole 43c can easily be enlarged. As a result, the cap 43 can be securely hooked to the rubber blade 14.

(6) In the present embodiment, the first hooking portion is the hooking protrusion 52, which is formed to project from the upper surface 41b of the base 41, and a cap side hooking portion hooked to the hooking protrusion 52 is the through-hole 43c. This eliminates the need for a complicated and expensive mold, such as a slide mold, that would be required to form a recess in the upper surface 41b of the base 41. As a result, the cost that would be required for a mold can be reduced. Further, the through-hole 43c can easily be manufactured in the cap 43 as compared with a recess that is not a through-hole.

(7) In the present embodiment, a height difference H between the upper surface 55a of the cap attachment portion 55 and the upper surface 41b of the longitudinally intermediate portion (portion excluding the cap attachment portion 55) of the base 41 is set to be substantially equal to the thickness T of the upper portion 43a of the cap 43 in the vertical direction. This allows the upper surface of the upper portion 43a of the cap 43 to be flush with the upper surface 41b of the intermediate portion in the longitudinal direction of the base 41. As a result, the cap 43 is prevented from getting caught, and the outer appearance of the wiper blade 12 can be improved.

The second embodiment may be modified as described below.

In the embodiment described above, the hooking protrusion 52 of the rubber blade 14 is arranged to overlap the hooking projection 41e in the longitudinal direction but not particularly limited in such a manner. For example, the hooking protrusion 52 may be arranged inward in the longitudinal direction from the hooking projection 41e. In particular, when the hooking projection 41e is overlapped in the longitudinal direction with the hooking projection 41f, which is hooked to the other backing 42b, or is arranged inward in the longitudinal direction from the hooking projection 41f, the cap attachment portion 55 further resists stretching outward in the longitudinal direction.

In the embodiment described above, the first hooking portion of the rubber blade 14 is the hooking protrusion 52, and the cap side hooking portion that is hooked to the hooking protrusion 52 is the through-hole 43c. In addition, for example, the first hooking portion may be a recess, and the cap side hooking portion may be a projection formed on the inner surface of the cap 43.

In the embodiment described above, the hooking recesses 42c and 42d are formed in the backings 42a and 42b, and the hooking projections 41e and 41f are formed on the rubber blade 14 (attachment grooves 50a and 50b). However, this recess-projection relationship may be reversed.

In the embodiment described above, the hooking protrusion 52, which is hooked to the cap 43, is arranged on the upper surface 41b of the base 41 of the rubber blade 14. In addition, the hooking protrusion 52 may be arranged, for example, on a widthwise side of the rubber blade 14.

In the embodiment described above, the distance from the longitudinal end portions of the backings 42a and 42b is different between the hooking recess 42c of one backing 42a and the hooking recess 42d of the other backing 42b to prevent erroneous coupling but not particularly limited in such a manner. For example, the distance from the longitudinal end portions of the backing 42a and 42b to the hooking recess 42c and 42d may be equal. The hooking projections 41e and 41f may be arranged at only one of the longitudinal end portions in the attachment grooves 50a and 50b of the rubber blade 14.

The first and second embodiments may be modified as below.

The upper surface 55a of the cap attachment portion 55 may be flush with the upper surface 41b of the longitudinally intermediate portion of the base 41.

The number of the holding portions 31 and 32 is not limited and may be three or more.

The holder member 13 may be configured by a plurality of members.

The shape of the holder member 13 (in particular, the shape of a portion of the holder member 13 coupled to the wiper arm 11 and the shape of the two longitudinal end portions of the holder member 13), and the shapes of the rubber blade 14, the backings 42a and 42b, and the cap 43 may be changed as required.

The wiper blade of the embodiment described above may be applied to a wiper that wipes a rear window of a vehicle.

The invention claimed is:

1. A wiper blade comprising:
a rubber blade that wipes a wiping surface, wherein the rubber blade includes a base and at least one attachment groove, which extends in a longitudinal direction;
at least one backing having a predetermined rigidity and including a central part outwardly curved opposite to the wiping surface, wherein the backing is formed from a spring material and fitted into the attachment groove of the rubber blade; and
an elongated holder member including a longitudinally central part coupled to a distal portion of a wiper arm, a first end and second end, which are arranged at two longitudinal sides, and a first holding portion and second holding portion, which are respectively arranged at the sides of the first end and the second end, wherein the first holding portion and the second holding portion hold the base of the rubber blade, wherein
the rubber blade projects in the longitudinal direction from the first and second holding portions of the holder member thereby forming a following end portion that follows a curve of the wiping surface,
the holder member has a substantially U-shaped cross-section and includes an upper wall portion facing an upper surface of the base of the rubber blade and side wall portions facing each other and extending towards the wiping surface from two widthwise sides of the upper wall portion,
the first holding portion and the second holding portion each include a holding piece extending from the side wall portions in a widthwise direction toward the inside of the rubber blade, a bridge portion arranged at an inside of at least one of the first holding portion and the second holding portion and connecting between the side wall portions, and two contact wall portions extending outward in the longitudinal direction from at least one of the first holding portion and the second holding portion and respectively contacting two side surfaces of the following end portion,
the two contact wall portions are at least one of first contact wall portions and second contact wall portions, wherein the first contact wall portions are arranged between the holding piece of the first holding portion and the first end, wherein the second contact wall portions are arranged between the holding piece of the second holding portion and the second end, and
at least one of the first contact wall portions and the second contact wall portions have a length in the longitudinal direction that is longer than a length of the holding piece of the corresponding first holding portion and the second holding portion in a longitudinal direction.

2. The wiper blade according to claim 1, wherein the first holding portion and the second holding portion each include clamping wall portions further extending from the side wall portions toward the wiping surface and clamping the base of the rubber blade from two widthwise sides, and the holding piece extending from a distal portion of each clamping wall portion into a holding groove formed at a position closer to the wiping surface than the attachment groove of the rubber blade.

3. The wiper blade according to claim 2, wherein the bridge portion contacts with the upper surface of the base of the rubber blade.

4. The wiper blade according to claim 2, wherein the upper wall portion and the side wall portions of at least one of the first holding portion and the second holding portion extend outward in the longitudinal direction, and the upper wall portion and the side wall portions couple the two contact wall portions to each other at the extended portion.

5. The wiper blade according to claim 1, wherein the contact wall portions include two pairs of contact wall portions extending outward in the longitudinal direction from both of the first holding portion and the second holding portion and respectively contacting the two side surfaces of the following end portion.

6. The wiper blade according to claim 1, wherein:
the attachment groove is one of a plurality of attachment grooves extending in a longitudinal direction in widthwise sides of the base;
the rubber blade includes an end portion;
the backing includes a hooking portion;
the base of the rubber blade includes two longitudinal end portions;
the wiper blade further comprising two caps, wherein each of the two caps is attached to each of the two longitudinal end portions of the base of the rubber blade to prevent separation of the backing from the plurality of attachment grooves, wherein the cap includes a hooking portion arranged in the cap;

the end portion of the rubber blade includes a first hooking portion, which is hooked to the hooking portion of the cap, and a second hooking portion, which is hooked in a longitudinal direction to the hooking portion of the backing; and the first hooking portion overlaps the second hooking portion in the longitudinal direction or the first hooking portion is located inward in the longitudinal direction from the second hooking portion.

7. The wiper blade according to claim 6, wherein the second hooking portion is arranged at two end portions of the rubber blade.

8. The wiper blade according to claim 6, wherein the backing includes two backings, the hooking portion of one of the backings is positioned a first distance from a longitudinal end portion of the one of the backings and the hooking portion of the other backings is positioned a second distance from a longitudinal end portion of the other backings, wherein the first distance is different than the second distance, and the hooking portion of each backing is hooked to the second hooking portion only when the two backings are attached to the plurality of attachment grooves in a normal attachment state.

9. The wiper blade according to claim 6, wherein each of the two longitudinal end portions of the base includes a recessed upper surface.

10. The wiper blade according to claim 6, wherein the first hooking portion is arranged on the upper surface of the base of the rubber blade.

11. The wiper blade according to claim 10, wherein the first hooking portion is a protrusion formed on the upper surface of the base, and the hooking portion of one of the two caps, which is hooked to the first hooking portion, is a through-hole extending in a vertical direction of the one of the two caps.

12. The wiper blade according to claim 1, wherein the first holding portion and the second holding portion each include:
side wall portions;
clamping wall portions further extending from a part of the side wall portions toward the wiping surface; and
a bridge portion that couples the clamping wall portions.

13. The wiper blade according to claim 1, wherein
the first holding portion and the second holding portion each include clamping wall portions further extending toward the wiping surface from the side wall portions of the corresponding first holding portion and the second holding portion,
the clamping wall portions each have a distal end, which defines the holding piece extending in the widthwise direction toward the inside of the rubber blade,
the bridge portion connects between the clamping wall portions, and
the bridge portion contacts with the upper surface of the base of the rubber blade.

* * * * *